United States Patent
Alimpich et al.

[19]

[11] Patent Number: 6,128,017
[45] Date of Patent: Oct. 3, 2000

[54] DATA PROCESSOR CONTROLLED DISPLAY INTERFACE FOR CONTROL OF OPERATIONS WITH UNINTRUSIVE ERROR MESSAGE MONITORING

[75] Inventors: Claudia Alimpich; Benjamin Nelson Jeffcoat, both of Boulder; Deborah Elizabeth Neuhard; Luana Linda Vigil, both of Longmont; James Philip John Wittig, Boulder, all of Colo.

[73] Assignee: International Business Machines Corporation, Armonk, N.Y.

[21] Appl. No.: 09/092,590
[22] Filed: Jun. 5, 1998
[51] Int. Cl.[7] .............................. G06F 3/00; G06F 11/32
[52] U.S. Cl. .......................... 345/347; 345/340; 345/961; 714/48
[58] Field of Search ..................................... 345/326, 336, 345/340, 347, 501, 961, 966, 975; 714/48, 49

[56] References Cited

U.S. PATENT DOCUMENTS 5,276,801  1/1994  Heyen et al. ............................ 345/501
5,454,074  9/1995  Hartel et al. ............................. 345/326
5,937,151  8/1999  Kadota .................................. 714/48 X
5,953,010  9/1999  Kampe et al. ....................... 345/966 X
6,000,046  12/1999  Passmore .............................. 714/48 X

FOREIGN PATENT DOCUMENTS

0767591  9/1997  European Pat. Off. ....... H04N 17/00

*Primary Examiner*—Raymond J. Bayerl
*Assistant Examiner*—X. L. Bautista
*Attorney, Agent, or Firm*—J. B. Kraft; David W. Victor; Konrad Raynes & Victor LLP

[57] ABSTRACT

In a data processor controlled display system interface for controlling operations, there is provided an error message monitoring and logging system which includes an indicator having a normal state and an attention state together with means for switching said indicator to the attention state upon receipt of a new error message. There are means for enabling a user to designate or click on this indicator and means responsive to said designation for displaying a log including at least said new error message. There are also means responsive to a subsequent user designation or clicking on of the indicator for removing said log and means for restoring said indicator to the normal state after said log is displayed.

29 Claims, 9 Drawing Sheets

DATA PROCESSOR CONTROLLED DISPLAY INTERFACE FOR CONTROL OF OPERATIONS WITH UNINTRUSIVE ERROR MESSAGE MONITORING

TECHNICAL FIELD

The present invention relates to interactive computer controlled display systems for controlling operations, and particularly to display interfaces that provide error message notification and tracking.

BACKGROUND OF THE INVENTION

Computer application programs are widely used in business, industry and academic endeavors. There is a large and diverse segment of workers and consumers that must interface with these applications. The developers of many application programs are required to target a group of potential users having a broad range of skill levels. The program developer's choices in designing interfaces have a significant impact in the control of production operations. This vast area includes the printing trades, the production of parts, tools and dies, integrated circuit manufacturing and processing and chemical industry production as just a few examples. Because such production involves repetitive functions continuously performed over relatively long periods of time, the computerization of such operations takes advantage of the strengths of the computer. With the advance of computer control in production, the operator skill levels required for many operations has been reduced.

In production operations, high and continuous throughput is of prime importance. In display interfaces for controlling production operations, the operator at the interface is routinely provided with a sequence of error messages on the display screen. From time to time, such error messages are of sufficient significance for the operator to interrupt the operations and make changes to eliminate the error conditions. However, for the most part, error messages advise of conditions which either may be put off for subsequent action, require no action except for the operator to remain on alert for a potential or developing problem or may be beyond the skills and functions of the operator and thus may involve actions to be taken at a different operational level.

Most operations control systems have routines in place for shutting down operations when an error condition is so critical that it threatens injury to operators or damage to the operation equipment or products. As to all other error conditions, there is a need to alert the operator to the conditions, and to give the operator or the operations supervisor the opportunity to address the error condition immediately or to delay action until a future point in the operations.

SUMMARY OF THE INVENTION

The present invention offers a solution to satisfy the above-mentioned needs in a data processor controlled display system interface for the interactive control of operations. The system includes an indicator having a normal state and an attention state together with means for switching said indicator to said attention state upon receipt of a new error message. Means are provided for enabling a user to designate said indicator together with means responsive to such a designation for displaying a log including at least said new error message. The system also provides means responsive to a subsequent user designation of the indicator for removing the log from the display. Finally, means are provided for restoring said indicator to the normal state at a point after said log is displayed.

The attention state of the indicator is preferably distinguished from its normal state based upon color. This may be accompanied with an attendant explanatory text message. Also, at any point in the operations, the error message log may be emptied by removal of all of the stored messages in it when the operators have resolved the problems resulting in the logged error conditions. It should be noted that the message log is preferably cumulative; each new error condition is stored in the error log along with previously stored error conditions.

Other objects, features and advantages of the present invention will be apparent from the accompanying drawings and from the detailed description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION OF THE PREFERRED EMBODIMENT

Figure 1:
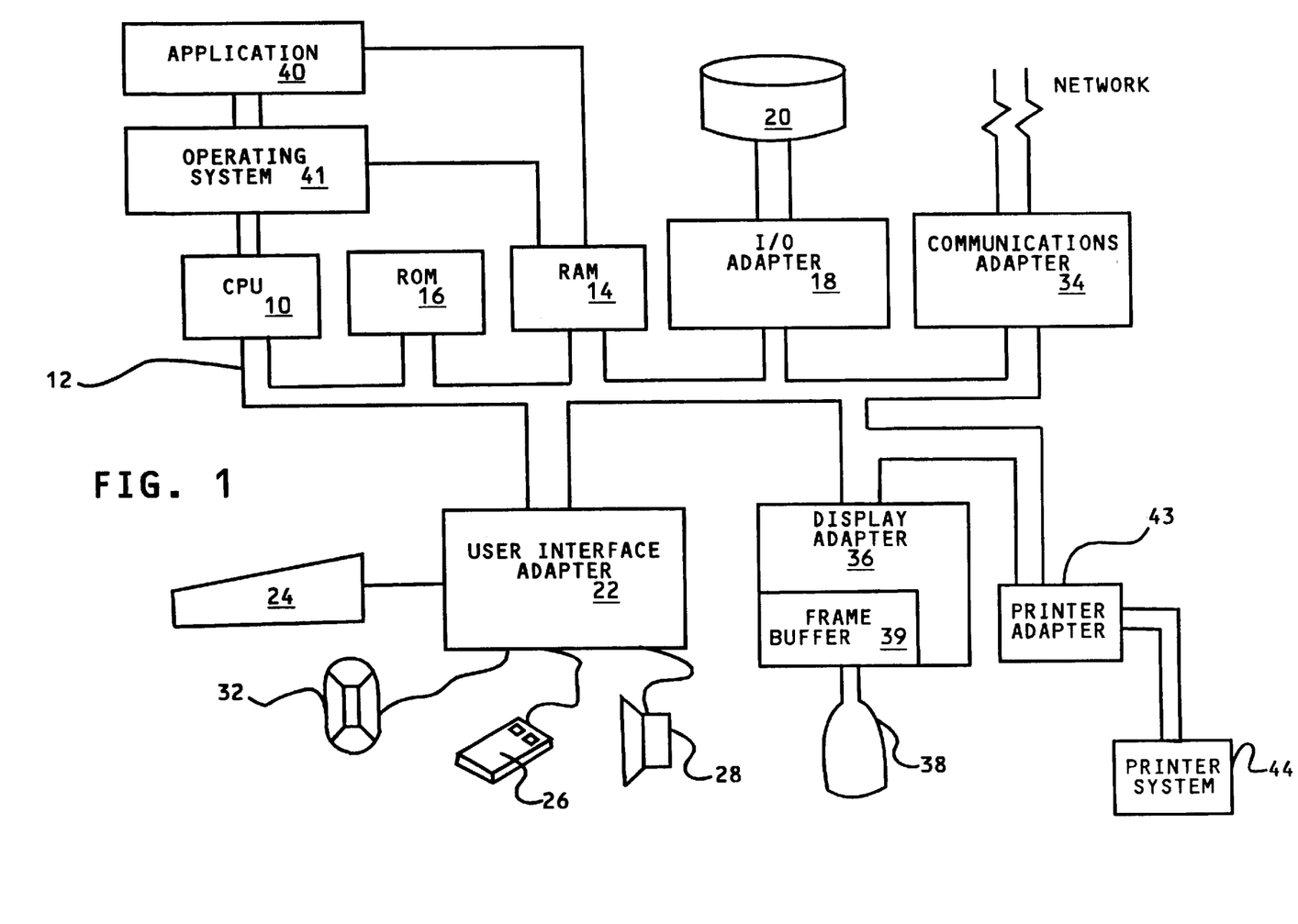
FIG. 1 is a block diagram of an interactive data processor controlled display system suitable for the present invention.

Referring to FIG. 1, a typical data processing system is shown which may function as the computer controlled display terminal used in implementing the error message monitoring and logging for the production control functions of the present invention. A central processing unit (CPU) 10, such as one of the PC microprocessors available from International Business Machines Corporation is provided and interconnected to various other components by system bus 12. An operating system 41 runs on CPU 10 and provides control and is used to coordinate the function of the various components of FIG. 1. Operating system 41 may be one of the commercially available operating systems such as DOS or the OS/2 operating systems available from International Business Machines Corporation (OS/2 is a trademark of International Business Machines Corporation); Microsoft's Windows 95™ or Windows NT™, as well as Unix and AIX (AIX is a registered trademark of International Business Machines Corporation) operating systems. Application program 40 represents a program for monitoring and controlling a production operation and runs in conjunction with operating system 41.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the application 40 are loaded into RAM 14 which is the computer system's main memory. I/O adapter 18 may be a small computer system interface adapter that communicates with the disk storage device 20, i.e. a hard drive. Communications adapter 34 interconnects bus 12 with an outside network enabling the data processing system to communicate with other such systems over a local area network (LAN) to control production operations. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and/or display 38. In the preferred embodiment, which will be subsequently described, the monitoring and logging of error messages will be in the production control of high throughput printers such as electrophotographic or laser printers. A local printer system 44 may be accessed and controlled via printer adapter 43 while networked printers may be communicated with via communications adapter 34. It is important to note that the present invention is not limited to the data processing system shown in FIG. 1 and may be extended to various other data processing system configurations.

A simple illustration of one embodiment of the present invention is described with respect to the display screens shown in FIGS. 2 through 7. When the screen images are described, it will be understood that these may be rendered by storing an image and text creation programs such as those in any conventional window operating system in the RAM 14 of the system of FIG. 1. The operating system is diagrammatically shown in FIG. 1 as operating system 41. This initial display screen is presented to the viewer on display monitor 38 of FIG. 1. In accordance with conventional techniques, the user may control the screen interactively through a conventional I/O device such as mouse 26 of FIG. 1 which operates through user interface 22 to call upon programs in RAM 14 cooperating with the operating system 41 to create the images in frame buffer 39 of display adapter 36 to control the display on monitor 38.

Figure 2:
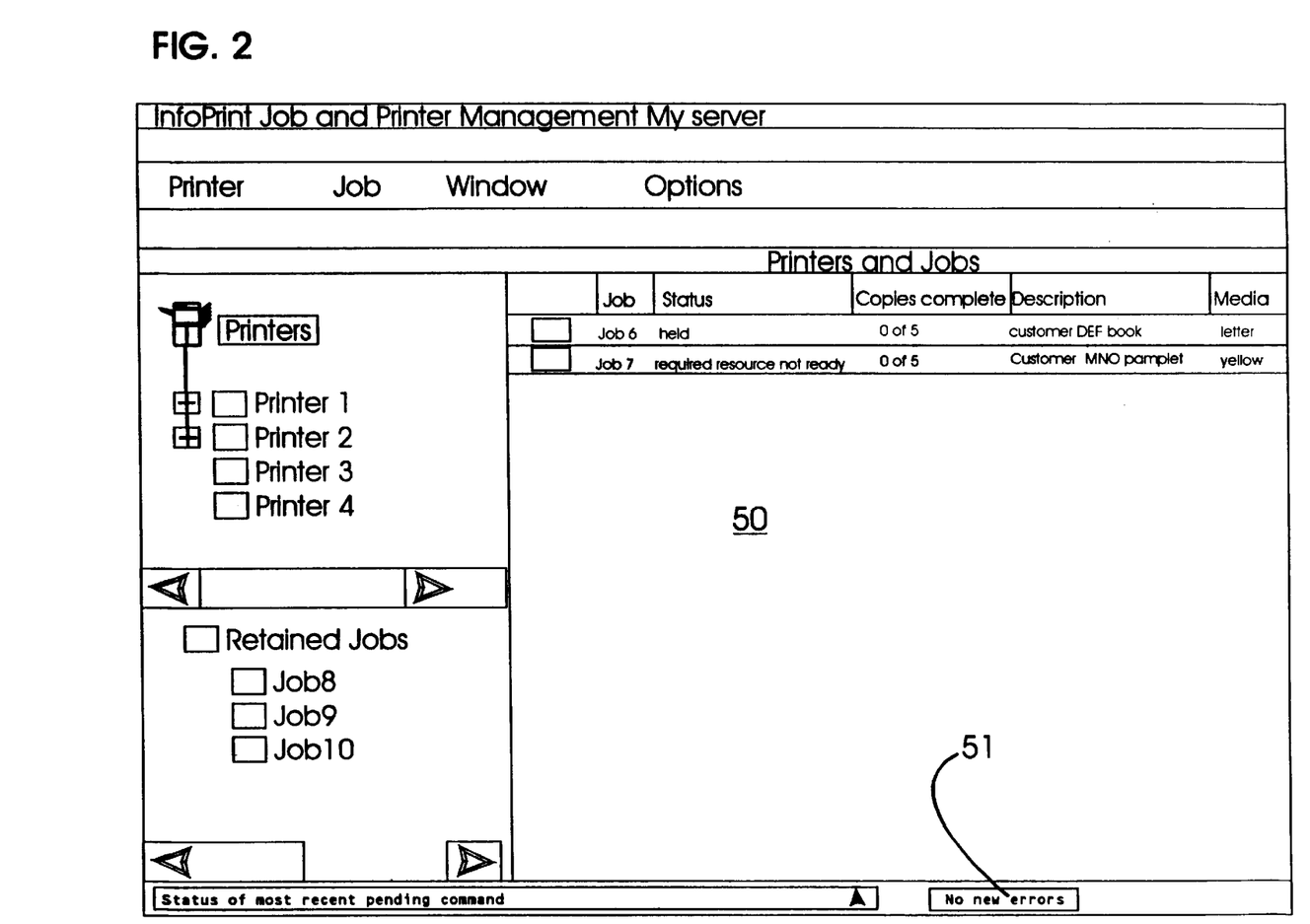
FIG. 2 is a diagrammatic view of a display screen indicating no new error messages with respect to printing operations for one embodiment of the present invention.

FIG. 2 shows a diagrammatic view of a display interface which may be used to control printer operations. For one embodiment of the present invention the display screen 50 presents the status of the printers and the status of jobs within a window. Without going into details which are not pertinent to the embodiment of the present invention, the operator may interactively control printer operations using screen 50.

Figure 3:
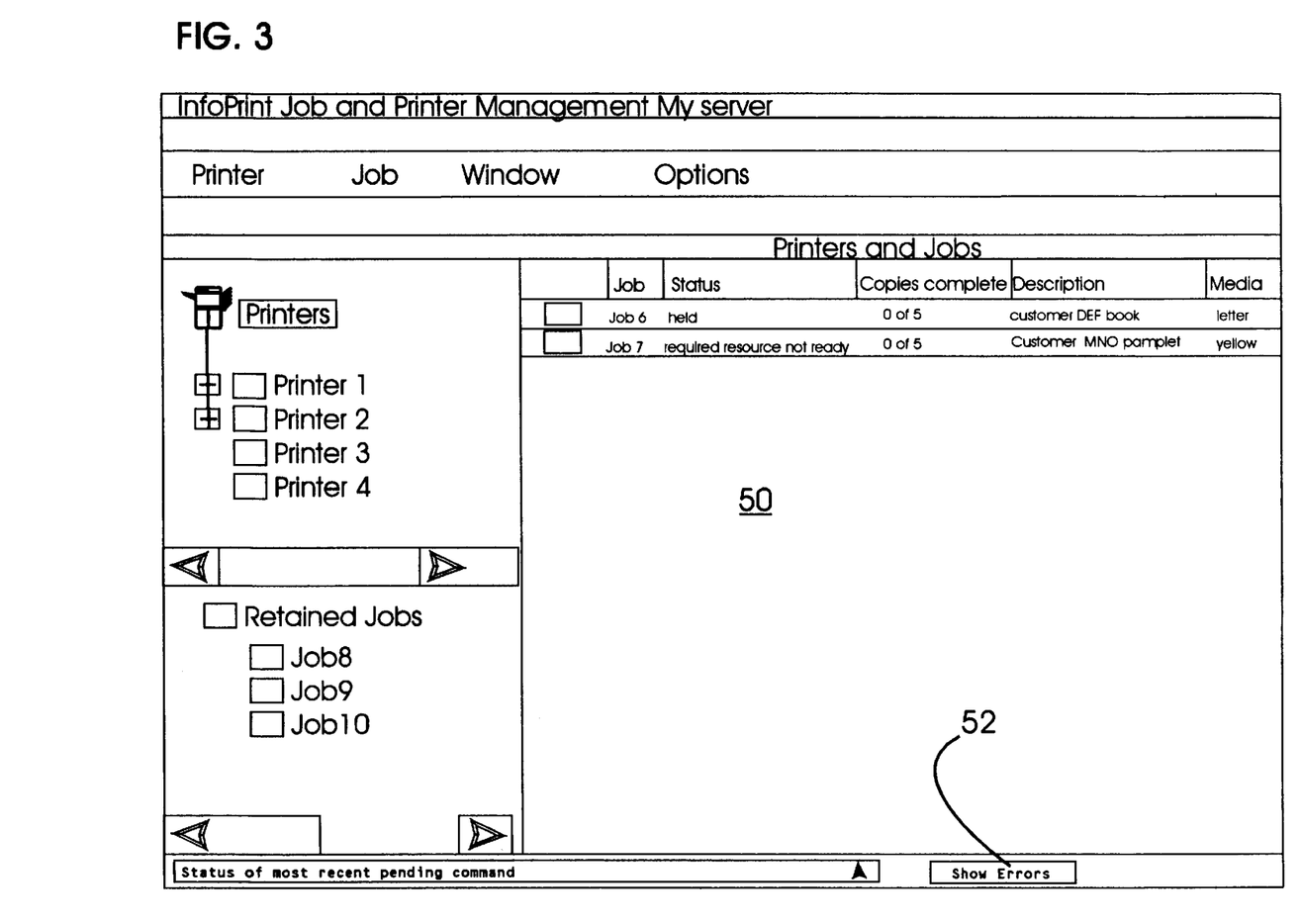
FIG. 3 is a diagrammatic view of a display screen indicating errors with respect to printing operations for one embodiment of the present invention.
Figure 4:
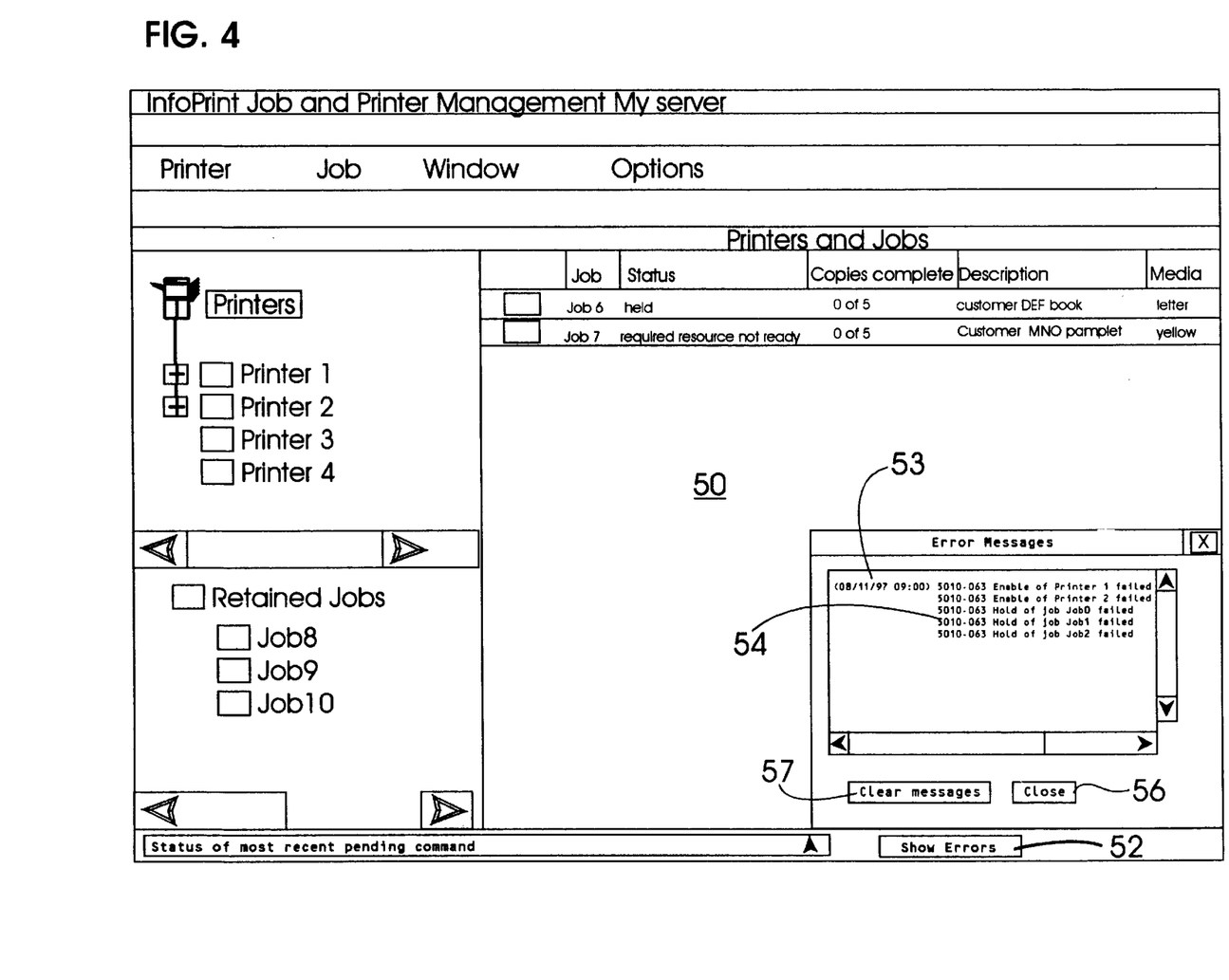
FIG. 4 is a diagrammatic view of a display screen displaying an error message log containing a first error message for one embodiment of the present invention.
Figure 5:
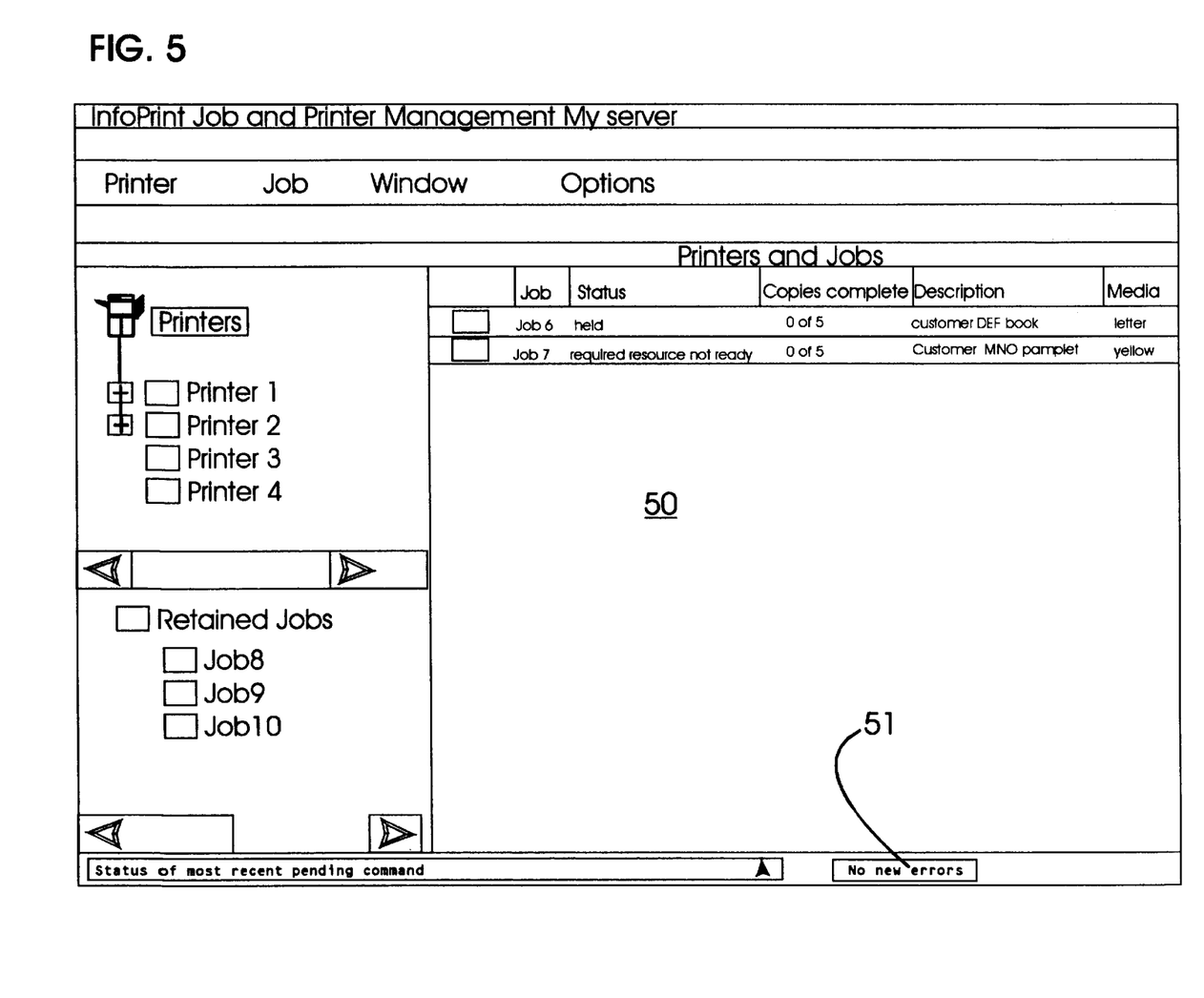
FIG. 5 is a diagrammatic view of a display screen after the error message log shown in FIG. 4 has been closed for one embodiment of the present invention.

Error button 51 represents a user selectable region and may be referred to as an active button. Error button 51 keeps the operator appraised of a variety of error conditions that occur. In FIG. 2, error button 51 is in its normal state 52a which indicates that there are no new errors. During the normal state 52a of error button 51, error button 51 may display the message, "No New Errors". FIG. 3 indicates that a new error condition has occurred with respect to the printer operations being controlled. When a new error condition occurs, error button 51 changes to the error attention state 52b. During the error attention state 52b, error button 51 may be highlighted (as in the present case, by a change in color) and may display the message "Show Errors". At this point, the operator is not required to halt operations; but, instead, may select and enable the attention error button 51 to display an error log window 53 as shown in FIG. 4. The new message 54 in the error log dated 8/11/97 09:00 describes a list of five new error conditions. These new error conditions are preferably in a color different from existing error conditions of which there are none in the present example. The operator may determine that none of the conditions should be very destructive to equipment or product and choose to continue the operation. However, the conditions may be saved in the error log so that they may be dealt with at some future point and probably by an operation supervisor with greater overall remedial skills than the on-line operator. Thus, the operator may choose not to by selecting a clear button 57 (e.g. by clicking on it). Furthermore, the operator may choose to hide error log 53 by either clicking again on error button 51 or by pressing Close button 56. The result is shown in FIG. 5 with the disappearance of the error log and the redisplay of the normal state 52a of error button 51.

At a later time, i.e. at 08/11/97 17:10, a new error may occur causing error button 51 to change to the error attention state 52b. Once again the operator may press error button 51 to display error log 53 with the now old message 54 and the new error message 55 as shown in FIG. 6.

Figure 6:
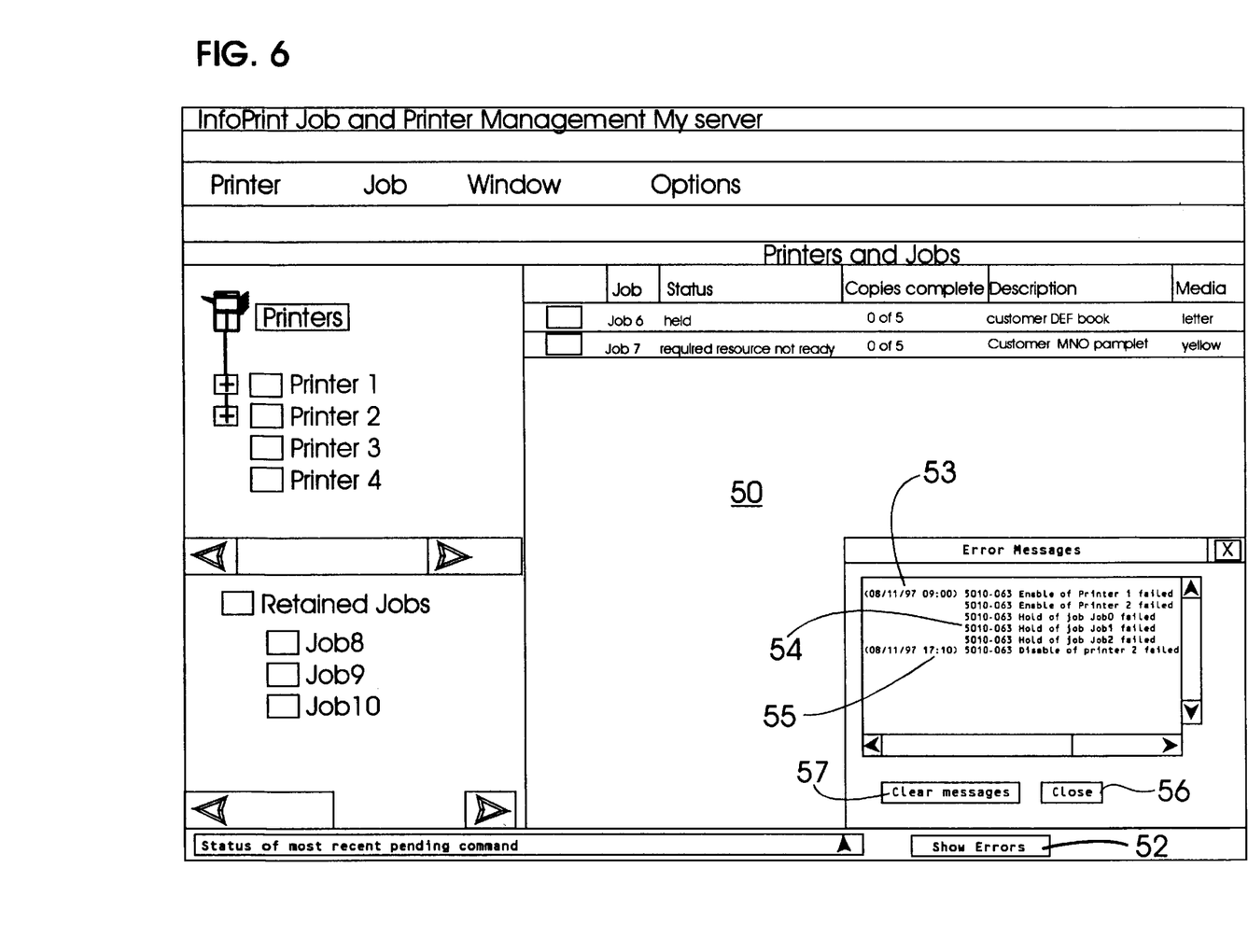
FIG. 6 is a diagrammatic view of a display screen displaying an error message log containing the new and previous error messages for one embodiment of the present invention.
Figure 7:
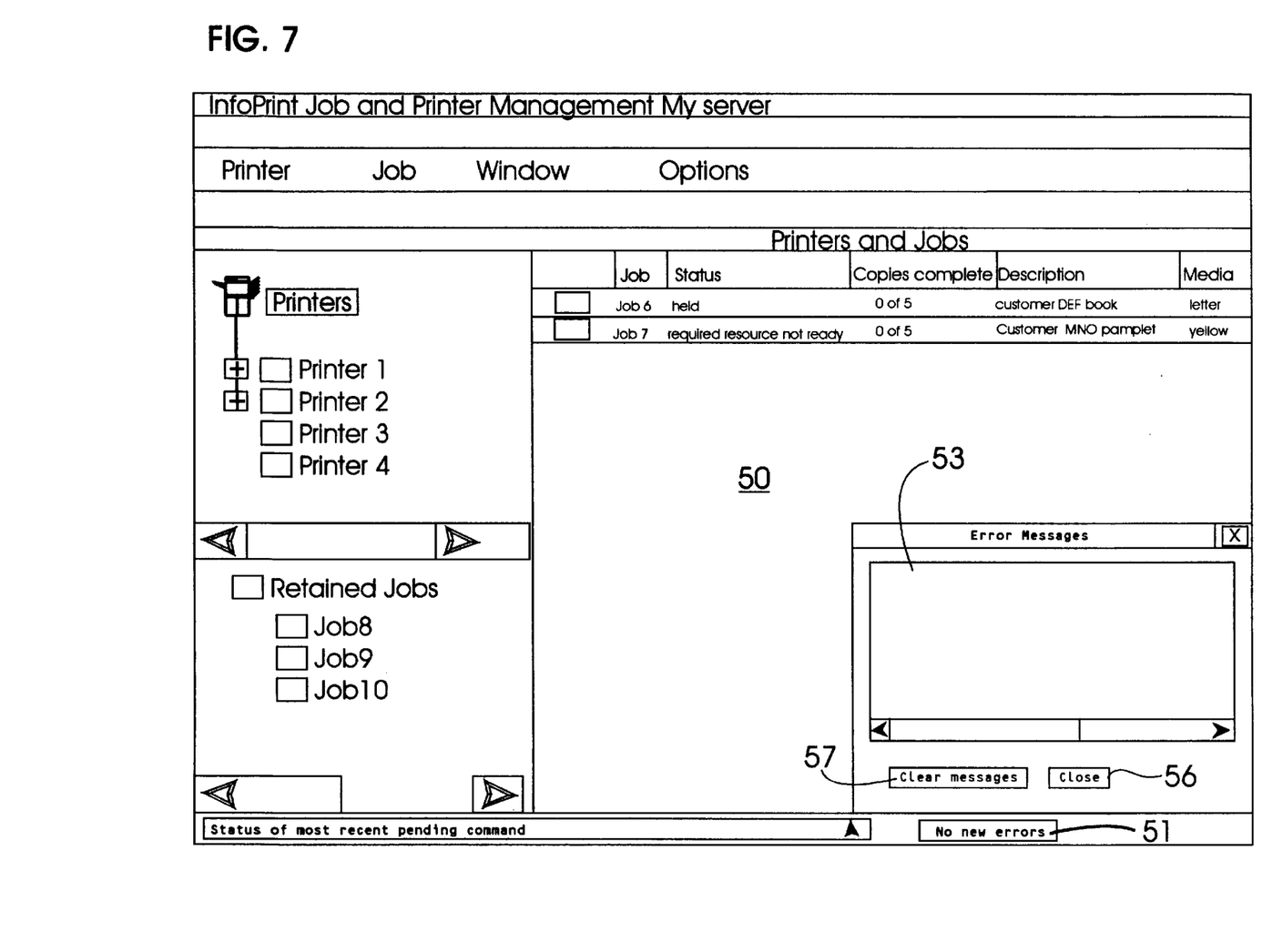
FIG. 7 is a diagrammatic of a display screen in which all error messages have been deleted from the error message log.

The error log continues to accumulate error messages as shown in FIG. 6 until the operator or his supervisor has decided to clear the log. The error log is often cleared after the operator or supervisor has reviewed the error message and made the desired corrections. In such a case, the "Clear Messages" button 57 is selected, and the messages are cleared as shown in FIG. 7 to result in an empty message log 53 and to return error button 51 to the normal state 52b. The log may then be closed as previously described to return to the display screen of FIG. 2.

Figure 8:
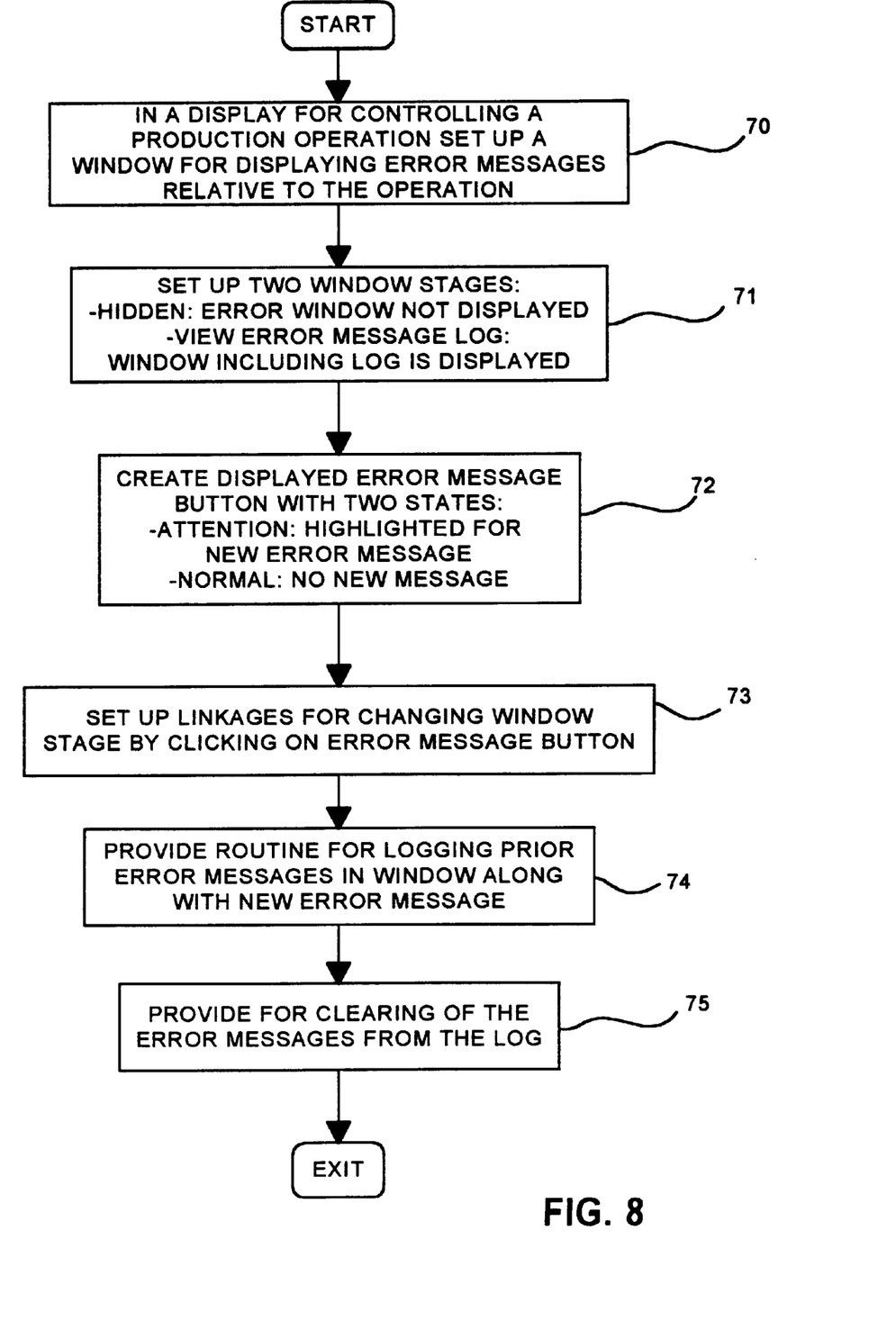
FIG. 8 is a flowchart showing the development of the program of the present invention for providing a display interface for the monitoring and logging of error messages in production control.

Now, referring to FIG. 8, a method of developing an interactive display system for controlling printing operations according to the present invention is described. In step 70, a basic window interface is set up, to allow the operator to interactively control printer operations. The display is set up to include an error message log window for displaying error messages relative to the operation. In step 71, two window stages for the error log window are set up: the hidden stage and the viewable stage. A display for an error button is created in step 72 which includes two states: the normal state indicating no error messages or the attention state indicating a new error message is present. Appropriate linkages are set up for changing window stages through the selection of the error button, as shown in step 73. Next, routines are provided for maintaining a chronological log of error messages as shown in step 74 and for clearing the errors from the message log when they are no longer needed as shown in step 75.

Figure 9:
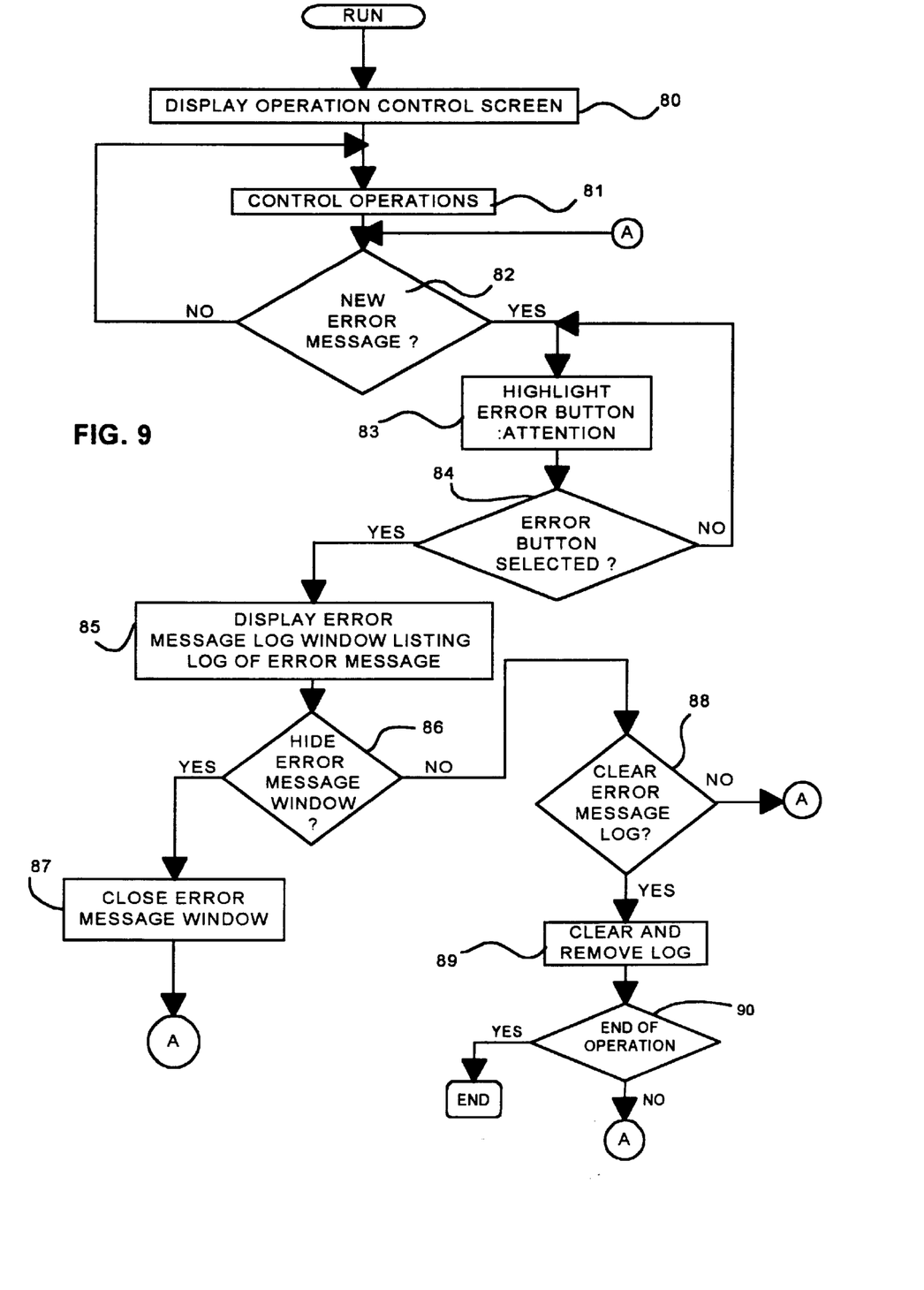
FIG. 9 is a flowchart showing the running of the program described with respect to FIG. 8.

With reference to FIG. 9, a method of tracking and saving error messages to control printing operations on an interactive display system according to one embodiment of the present invention. While the program is running, an operation control screen is displayed as shown in step 80, such that the operator may interactively control operations, as shown in step 81, through the display interface as shown on screen 50 in FIGS. 2 through 7. The operation continues until it is determined in decision step 82 that an error message is present. This may result in the error message button (e.g. error button 52 of FIG. 3) being highlighted, as shown in step 83. Then, in step 84, a determination is made as to whether the operator has selected the error button (e.g. by clicking on it). If "No", step 83 is repeated. The error button remains highlighted until the error button is selected. If the decision from step 84 is "Yes", the error message window, which displays a log of the error messages, is displayed in step 85. The error log remains visible until the operator, decides to close the error message window in step 86. The process then proceeds to step 87, to hide the error message window, and then returns to decision step 82 via branch "A".

If, at some point, the operator decides not to save the contents of the error message log, then the decision at step 86 is "No" and the decision at step 88 is "Yes". Next, in step 89, the error message log is cleared. In any event, at this point or even if the decision in step 88 is not to clear the error message log, a determination is made as to whether the operation being controlled is over, step 90. If "Yes", then the operation is ended. If the operation is not completed, the flow is returned to decision step 82 via branch "A".

While the present invention has been described using printing operations as the illustrative example, the invention is equally applicable to the monitoring and control of a wide variety of industrial, chemical and manufacturing production operations, including the manufacturing of integrated circuits, as well as automated tool and die production. In production in all of these areas, it would be advantageous to monitor error messages and to maintain error logs.

Although certain preferred embodiments have been shown and described, it will be understood that many changes and modifications may be made therein without departing from the scope and intent of the appended claims.

What is claimed is:

1. A data processor controlled display system interface for the interactive control of operations comprising:

an indicator having a normal state and an attention state, means for switching said indicator to said attention state upon receipt of a new error message, means for enabling a user to select said indicator, means responsive to said selection for displaying a log including at least said new error message, means for removing said log, and means for restoring said indicator to the normal state after said log is displayed.

2. The data processor controlled display system of claim 1 wherein said normal state and said attention state of said indicator respectively have different colors.

3. The data processor controlled display system of claim 1 further including means for deleting said error message from said log prior to removing said log.

4. The data processor controlled display system of claim 3 further including means for retaining said error message in said log subsequent to the removal of said log whereby said log including said retained error message may be redisplayed by said selection of said indicator.

5. The data processor controlled display system of claim 4 wherein said means for displaying said log including a new error message also displays said retained error message.

6. The data processor controlled display system of claim 5 wherein said operations are production operations.

7. The data processor controlled display system of claim 6 wherein said production operations are printing operations.

8. The data processor controlled display system of claim 1, wherein said log is removed in response to the subsequent user selection of said indicator.

9. In a data processor controlled display system interface, a method for the interactive control of operations comprising:

displaying an indicator having a normal state and an attention state, switching said indicator to said attention state upon receipt of a new error message, enabling a user to select said indicator, displaying a log including at least said new error message responsive to said selection, removing said log responsive to a subsequent user selection, and restoring said indicator to the normal state after said log is displayed.

10. The method of claim 9 wherein said normal state and said attention state of said indicator respectively have different colors.

11. The method of claim 9 further including the step of deleting said error message from said log prior to removing said log.

12. The method of claim 11 further comprising the step of retaining said error message in said log subsequent to the removal of said log whereby said log including said retained error message may be redisplayed by said selection of said indicator.

13. The method of claim 12 wherein said retained error message is displayed in said log including a new error message.

14. The method of claim 13 wherein said operations are production operations.

15. The method of claim 14 wherein said production user selection of said indicator.

16. The method of claim 9, wherein said log is removed in response to the subsequent operations are printing operations.

17. A computer controlled display program having program code included on a computer readable medium for the interactive control of operations, wherein the program code is capable of causing the computer to perform:

displaying an indicator having a normal state and an attention state, switching said indicator to said attention state upon receipt of a new error message, enabling a user to select said indicator, displaying a log including at least said new error message responsive to said selection, removing said log responsive to a subsequent user selection, and restoring said indicator to the normal state after said log is displayed.

18. The computer program of claim 17 wherein said normal state and said attention state of said indicator respectively have different colors.

19. The computer program of claim 17 further causing the computer to perform deleting said error message from said log prior to removing said log.

20. The computer program of claim 19 further causing the computer to perform retaining said error message in said log subsequent to the removal of said log whereby said log including said retained error message may be redisplayed by said selection of said indicator.

21. The computer program of claim 20 wherein displaying said log including a new error message also displays said retained error message.

22. The computer program of claim 21 wherein said operations are production operations.

23. The computer program of claim 22 wherein said production operations are printing operations.

24. The computer program of claim 17, wherein said log is removed in response to the subsequent user selection of said indicator.

25. In a data processor controlled display system interface, a method for the interactive control of operations, comprising the steps of:

(a) providing a first user selectable region on a display;

(b) displaying said first user selectable region in a first state if no new error messages are received, wherein the first state comprises a normal state;

(c) displaying in said first user selectable region a switch from the display of the first state to a second state if at least one new error message is received, wherein said second state comprises an attention state;

(d) selecting said first user selectable region in said second state in response to user input;

(e) displaying an error message log that includes said at least one new error message in response to step (d);

(f) closing said error message log in response to user input; and (g) displaying said first user selectable region in said first state as restored to the normal state in response to step (f).

26. The method of claim 25 further comprising, after step (e), the step of:

(h) deleting at least said one new error message from said error message log in response to user input.

27. The method of claim 25 wherein step (e) includes the step of displaying said error message log in a window.

28. The method of claim 27 wherein said window includes a second user selectable region, and wherein step (f) includes the step of selecting said second user selectable region in response to user input to close said window.

29. The method of claim 27, wherein said window includes a third user selectable region, and further including, between steps (e) and (f), the step of:

(i) selecting said third user selectable region in response to user input to delete at least said one new message from said error message log.

* * * * *